(12) United States Patent
Taylor et al.

(10) Patent No.: US 9,063,892 B1
(45) Date of Patent: Jun. 23, 2015

(54) MANAGING RESTORE OPERATIONS USING DATA LESS WRITES

(75) Inventors: Alan L. Taylor, Cary, NC (US);
Michael D. Haynes, Raleigh, NC (US);
Paul T. McGrath, Raleigh, NC (US);
Miles A. de Forest, Bahama, NC (US);
Dayanand Suldhal, New Canaan, CT (US); Nagapraveen V. Seela, Cary, NC (US); David Haase, Fuquay Varina, NC (US)

(73) Assignee: EMC Corporation, Hopkinton, MA (US)

( * ) Notice: Subject to any disclaimer, the term of this patent is extended or adjusted under 35 U.S.C. 154(b) by 385 days.

(21) Appl. No.: 13/436,862

(22) Filed: Mar. 31, 2012

(51) Int. Cl.
*G06F 11/14* (2006.01)
*G06F 11/20* (2006.01)

(52) U.S. Cl.
CPC ........ *G06F 11/1446* (2013.01); *G06F 11/1469* (2013.01); *G06F 11/1451* (2013.01); *G06F 11/1448* (2013.01); *G06F 11/1466* (2013.01); *G06F 11/2043* (2013.01)

(58) Field of Classification Search
CPC ............ G06F 11/1446; G06F 11/1448; G06F 11/1451; G06F 11/1466; G06F 11/1469; G06F 11/2043
USPC ............ 707/999.202, 999.204; 711/162, 160, 711/161; 714/20, 6.11, 6.2, 6.21, 6.22, 714/6.23, 15, 21
See application file for complete search history.

(56) References Cited

U.S. PATENT DOCUMENTS

| | | | |
|---|---|---|---|
| 6,912,636 B1 * | 6/2005 | Bromley et al. | 711/165 |
| 7,308,545 B1 * | 12/2007 | Kekre et al. | 711/162 |
| 2008/0240429 A1 * | 10/2008 | Kito et al. | 380/45 |
| 2011/0138136 A1 * | 6/2011 | Shitomi et al. | 711/154 |
| 2012/0011336 A1 * | 1/2012 | Saika | 711/162 |

* cited by examiner

*Primary Examiner* — Reginald Bragdon
*Assistant Examiner* — Mehdi Namazi
(74) *Attorney, Agent, or Firm* — Krishnendu Gupta; Jason A. Reyes; John T. Hurley

(57) ABSTRACT

A method is used in managing restore operations in storage systems. A state of a logical object is retrieved and a second logical object is placed in a pre-step mode. An instantaneous restore operation between the first logical object and the second logical object is performed. Changed data extents in the first logical object are identified. Data-less writes are sent to any identified extents in the first logical object.

16 Claims, 13 Drawing Sheets

MANAGING RESTORE OPERATIONS USING DATA LESS WRITES

CROSS-REFERENCE TO RELATED APPLICATIONS

This application is related to U.S. patent application Ser. No. 13/436,117, entitled MANAGING CONSISTENCY GROUPS IN STORAGE SYSTEMS, filed concurrently herewith, U.S. patent application Ser. No. 13/435,832, entitled RESTORING SNAPSHOTS TO CONSISTENCY GROUPS OF MOUNT POINTS filed concurrently herewith, U.S. patent application Ser. No. 13/435,519, entitled RESIZING SNAPSHOT MOUNT POINTS filed concurrently herewith, and U.S. patent application Ser. No. 13/435,914, entitled RESTORING LOGICAL OBJECTS TO DIFFERENT SIZED SNAPSHOTS filed concurrently herewith.

BACKGROUND

1. Technical Field

This application relates to managing restore operations using data less writes in storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Presently, there is a trend toward the use of larger operating systems, larger applications or programs, and larger file sizes. Understanding this trend, a storage administrator is likely to request the provisioning (i.e., allocation) of a larger portion of storage space than is currently required for an operating system, for example, with the expectation that the space requirements will grow with upgrades, bug-fixes, the inclusion of additional features, and the like.

In recognition of the fact that more storage space may be provisioned for operating systems, programs, and users than can actually be used at first, the concept of a sparsely populated logical unit (LU), such as a "thin" logical unit (TLU), was developed. Unlike the more traditional fully allocated logical unit, which is created by fully provisioning an entire initial amount of storage area, a sparsely populated logical unit is provisioned at creation but is not allocated any physical storage until the storage is actually needed. Specifically, a TLU resolves this problem by allocating the storage space (e.g., making the memory space physically available) as it is needed when (or shortly before) data is written to the TLU. A TLU is created from a common pool of physical space and starts with minimal amount of physical space. As the application that is using the TLU starts to demand more storage, the TLU incrementally requests the storage space from the common storage pool in portions referred to as slices.

SUMMARY OF THE INVENTION

A method is used in managing restore operations in storage systems. A state of a logical object is retrieved and a second logical object is placed in a pre-step mode. An instantaneous restore operation between the first logical object and the second logical object is performed. Changed data extents in the first logical object are identified. Data-less writes are sent to any identified extents in the first logical object.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
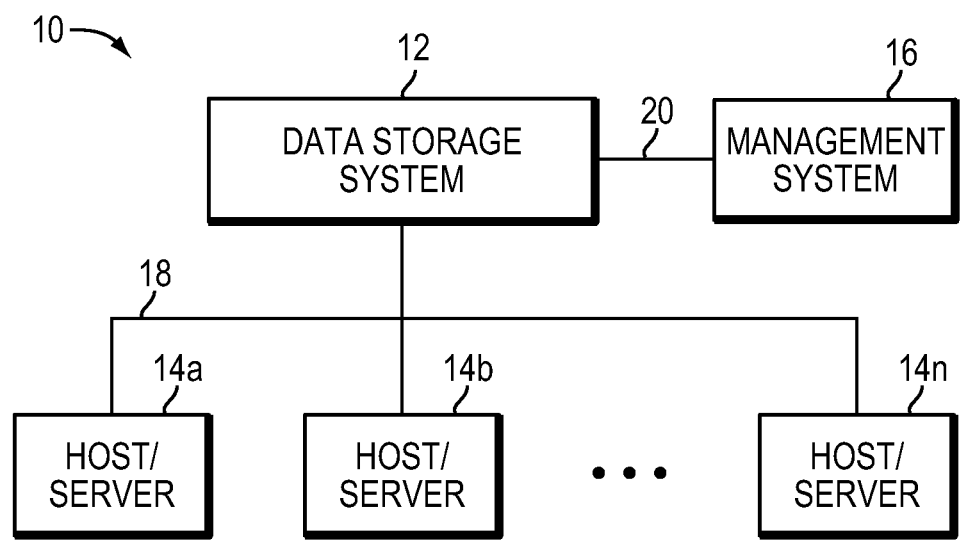
FIG. 1 is an example of an embodiment of a computer system that may utilize the techniques described herein.

Techniques described herein illustrate example embodiments where a logical unit (LU or LUN), snapshots, and snapshot mount points may be implemented using file system technology. With these techniques, logical objects such as LUs, snapshot, and snapshot mount point can be represented as files in a file system. LUs and snapshot may be associated with a file system object which includes file ID and file system ID information.

Such file system implementations provide the ability to easily and quickly restore a snapshot to a LU, for example to an earlier point in time snapshot. In an example embodiment, a system process may retrieve an object associated with a LU and snapshot for which a restore command is initiated. When the objects are found, the process identifies file objects associated with the LU and snapshot. A unique file ID that represents the underlying file in a file system for the LU and snapshot is determined. Then a call is made to the file system layer where the LU and snapshot file IDs are swapped, thereby executing the restore operation virtually instantaneously.

Storage systems may provide a layered driver stack where write operations flow through the stack as data is written to a LU. Layered device drivers between the host and LU may include a splitter, rollback, mirrorview, migration, and mapped LU driver (MLU). As part of its duties, the MLU informs layered drivers of changes to a LU resulting from a restore operation. Layered drivers may keep track of the LUN state by handling read and write requests as part of their functionality (e.g. tracking maps, synchronizations, etc.). Thus, some drivers may need to be aware of write request sent to the LUN (e.g., mirrorview). However, the instantaneous restore method described herein effectively changes LUN data without sending write requests down the device stack. Consequently, in the event of a restore operation, the layered drivers are unaware that the LUN has been restored.

Techniques described herein provide example embodiments wherein a snapback driver may be added near the top of a layered device driver stack that can enumerate the changed regions on the LU. As changed regions are identified, the new snapback driver issues a data-less write to the device stack. Data-less writes contain offset and length like a standard write, but do not carry a data payload. Layered drivers can operate on data-less writes in a similar fashion to standard write requests (e.g. mark tracking maps, etc.). The data-less write request may be in a form that can carry multiple changed regions at once. The restore logic can coalesce changed regions into a larger region if appropriate. Due to coalescing, the regions described by the data-less write may or may not match the original I/Os that caused the difference. Some device stacks may not contain a layered driver that needs notification of the changed regions during a restore. A negotiation phase may inform the snapback driver that data-less writes are not required on the device stack. The negotiation phase may let the layered driver specify an extent granularity for the data-less writes.

Advantageously, data-less writes provide an optimized method for communicating changed regions of data quickly. During roll-back or restore operations, layered drivers may cease replication until all changed regions have been communicated. This optimized process reduces the window for halting replication for a user.

By contrast, conventional methods cannot perform instantaneous restore operations. Thus, these conventional methods need to read the data from a snapshot and write to a source/primary LU. This data may be stored in a reserved pool LU, and if numerous data writes have occurred since the last snapshot was taken, the restore process can take a considerable amount of time. In addition to being time consuming, it also wastes storage system resources (e.g. cache, CPU).

In at least some implementations in accordance with the current technique as described herein, the use of restoring LUs or snapshot mount points of different sizes in storage systems technique can provide one or more of the following advantages: lowering storage costs by improving efficiency of a data storage system and improving performance of a data storage system by efficiently managing restore operations as well as layered features (e.g., mirrorview, clones, etc.).

Additional details regarding mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety, U.S. Pat. No. 7,055,059, entitled "Remote data mirroring," issued on May 30, 2006, and assigned to EMC Corporation of Hopkinton, Mass., which is hereby incorporated by reference in its entirety, and U.S. Pat. No. 6,496,908, entitled "Remote mirroring," issued on Dec. 17, 2002, and assigned to EMC Corporation of Hopkinton, Mass., which is hereby incorporated by reference in its entirety. Further, various example embodiments described herein utilize MirrorView/S, a product developed by EMC Corporation of Hopkinton, Mass., as a vehicle to illustrate techniques described herein. However, this should not be construed as a limitation, and other layered driver applications including, but not limited to, Clones, MirrorView/FAR, MirrorView/A, SnapCopy, and Migration may be similarly employed.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage system 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host/server computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host/server computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host/server computer systems may perform different types of data operations in accordance with different types of tasks. In the embodiment of FIG. 1, any one of the host/server computers 14a-14n may issue a data request to the data storage systems 12 to perform a data operation. For example, an application executing on one of the host/server computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host/server computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
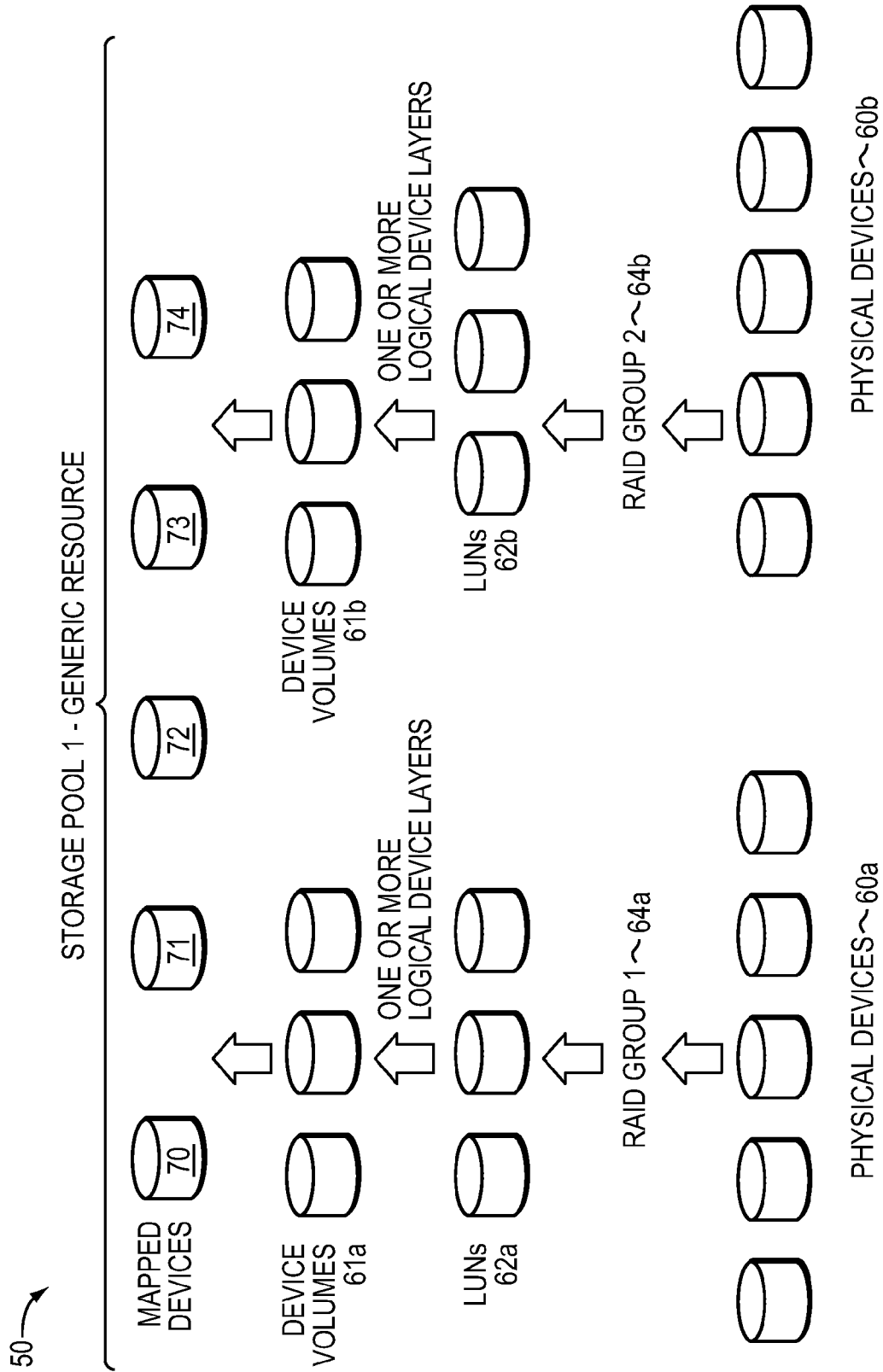
FIG. 2 is an example illustrating storage device layout.

Referring to FIG. 2, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used to form a storage pool in an embodiment using RAID techniques.

The data storage system 12 may also include one or more thin devices 70-74. A thin device (also referred to as "thin logical unit") presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space. Further, a mapped LUN (e.g., mapped devices 70-74) may either be a direct mapped logical unit or thin logical unit.

Generally, it is desirable to copy or replicate data for a variety of different reasons, such as, for example, database-related data may be critical to a business so it is important to make sure is not lost due to problems with the computer systems, such as for example, loss of electrical power. Some systems only copy, replicate, or back up data that has changed since the last such operation and this is known as incremental copying, replicating, or backup.

For mission-critical applications requiring high availability of stored data, various methods for enhancing data reliability are typically employed. One such method is to provide a "mirror" for each storage device. In a mirror arrangement, data are written to at least two storage devices. Thus, data may be read from either of the two storage devices so long as the two devices are operational and contain the same data.

In general, copying data from a first location (e.g., including one or more data volumes) to a second may be done for a myriad of reasons, including replication and backup/versioning. In a replication operation, a data set may be copied from the first location to the second to ensure that the second is a mirror of the first and that each stores a copy of the data set such that if there is a failure that results in the data set being inaccessible from the first location, the second is available for access.

One illustrative method for forming a point in time copy of a data set is referred to as a snapshot and is described in detail in U.S. Pat. No. 6,792,518 to Armangau et al., which is incorporated herein by reference in its entirety.

A snapshot does not replicate a full copy of the data set (referred to as a production data set). Rather, the snapshot only stores differences between a current version of the production data set and the version of the data set at the point in time when the snapshot was last taken. Multiple snapshots can also be created at different times, and can work together so that only the most recently created snapshot directly tracks changes to the production data set.

As should be appreciated from the foregoing, snapshots can be used to determine previous states of a data set at past times without needing to make a full copy of the data set at those past times. Instead, only the "deltas" or differences are stored in snapshots. Snapshot copies are in widespread use for on-line data backup. If a file becomes corrupted, the file is restored with its most recent snapshot copy that has not been corrupted.

A data storage system may be considered a source or local system and replication, backup, or other copying may be performed to a target or remote system. The term remote as used herein means being on a different storage system, although source and target systems may actually be the same system but the data may be sent to a different storage device or even a different location on the same storage device in the same system. A remote system may include storage devices (e.g. hard drives) that may function to duplicate or simulate some or all of the local system on a volume-by-volume basis and that the volumes can by physical volumes or logical volumes. Devices and volumes in a logical sense are also used interchangeably throughout. With further regard to terminology, copying is used throughout to generally refer to any way of duplicating data that is stored in one storage location (e.g. production data on the source or local system) to another storage location (e.g. data copy on the target or remote system) for any reason including, replication, backup, restore, or general mirroring.

In general, in replication processes, two or more data sets are maintained in a mirrored state such that there is a redundant copy of the data stored in the data set. A replication process may be synchronous (i.e., data is stored to the mirror as it is committed to the production data set) or asynchronous. Asynchronous replication volumes may therefore be a few seconds, minutes, or even hours out of sync with the data volume, according to the particular replication processes implemented.

In some illustrative embodiments described below, the data set for which a snapshot is taken to support replication is a logical unit mapped to a file system and the data units therefore are referred to as data blocks that are allocated to the file system. In addition, the level of data units that are tracked as being changed need not correspond to data blocks, but can be any suitable data unit. Similarly, it should be appreciated that the embodiments of the technique described herein are not limited to use with a snapshot facility that employs particular data structures identified as a block or data unit, and can be used with snapshot facilities that employ any suitable type of data structure or structures. In some implementations, a snapshot may be adapted to be used only by replication processes, and as such may only store information which is to be used by a replication process. However, in accordance with other embodiments of the technique, a snapshot that is used by a backup/versioning process or any other data copying operation may also be used to support a replication process, and accordingly the snapshot may store information usable by both types of processes.

In at least one embodiment of the current technique, a data storage system may use at least two different snapshot copy facilities such that the first snapshot copy facility creates a copy on first write snapshot as described below herein in FIG. 3 and the second snapshot copy facility creates a redirect on write snapshot based on a file system based snapshot copy utility as described below herein in FIG. 4. It should be noted that the current technique described herein is based on the second snapshot copy facility that creates a redirect on write snapshot.

The following definitions may be useful in understanding the specification and claims but are not meant to be limiting.

Base Logical Unit ("LUN")—may be a direct mapped logical unit ("DLU") or thin logical unit ("TLU") based on which a snapshot copy is created.

Fully provisioned Logical Unit ("LUN")—may be a LUN that completely allocates storage space accessible by a host at the time the LUN is created. Fully provisioned LUN may also be referred to as a traditional LUN that is based on a RAID group.

Thin LUN ("TLU")—may be a mapped LUN that does not allocate complete storage space required for the mapped logical unit at the time the mapped LUN is created. Instead, storage space is allocated when a write request is issued to the mapped LUN. A thin LUN may include a set of slices. Each slice may be of 1 Gigabyte (GB) in size. Further, a slice may include a set of data blocks. A data block may be of 8 Kilobyte (KB) in size.

Direct LUN ("DLU")—may be a logical unit that allocates storage space at the time the logical unit is created and uses an arithmetic computation for mapping an extent of the logical unit to a portion of the allocated storage space.

Logical Block Address ("LBA")—may be an address of data on a storage device.

Slice—may be a portion of a storage space within a storage pool. A slice may be of 1 gigabyte (GB) in size.

Pool—may be a group of storage devices (e.g., disks) that are configured to be part of a storage pool. A storage pool may include a LUN (e.g., DLU, TLU). Further, a storage pool may also include a snapshot mount point.

Reserved LUN pool ("RLP")—may be a set of LUNs that are used to store data of a copy on first write snapshot.

Snapshot—may be a point in time copy (also referred to herein as "replica" or "snap") of a logical object (e.g., LUN, a file system). Thus, a snapshot may be a point in time copy of any one of the logical objects such as a base LUN (e.g. DLU, TLU), another snapshot, a consistency group ("CG"), and a snapshot mount point attached to a snapshot.

Consistency group ("CG")—may be a group represented by an object that includes a set of logical objects such that each logical object of the set of logical objects may be a base LUN, a snapshot of a base LUN, or a snapshot mount point representing a snapshot.

Snapshot mount point—may be a logical abstraction of a LUN. A snapshot mount point is also referred to herein as a snapshot LUN that enables a user or host system to access and manage a snapshot. Thus, a snapshot mount point enables a host to access and manage point in time copies of logical objects.

Source object—may be a source of a snapshot such that a point in time copy is created based on the source object. A source object may be a logical object such as a base LUN, a snapshot of a base LUN, a consistency group, or a snapshot mount point.

Snapback driver—may be a driver at or near the top of a layered device stack configured to communicate extents changed as part of a recover process.

Snapshot family—may be a set of snapshots and snapshot mount points associated with a base LUN. A snapshot family is also referred to herein as a replica family.

Working file—may be a file that is in use by a base LUN.

Mapped LUN ("MLU") driver—may be a component that manages logical units (e.g., DLU, TLU) and snapshots of the logical units.

Figure 3:
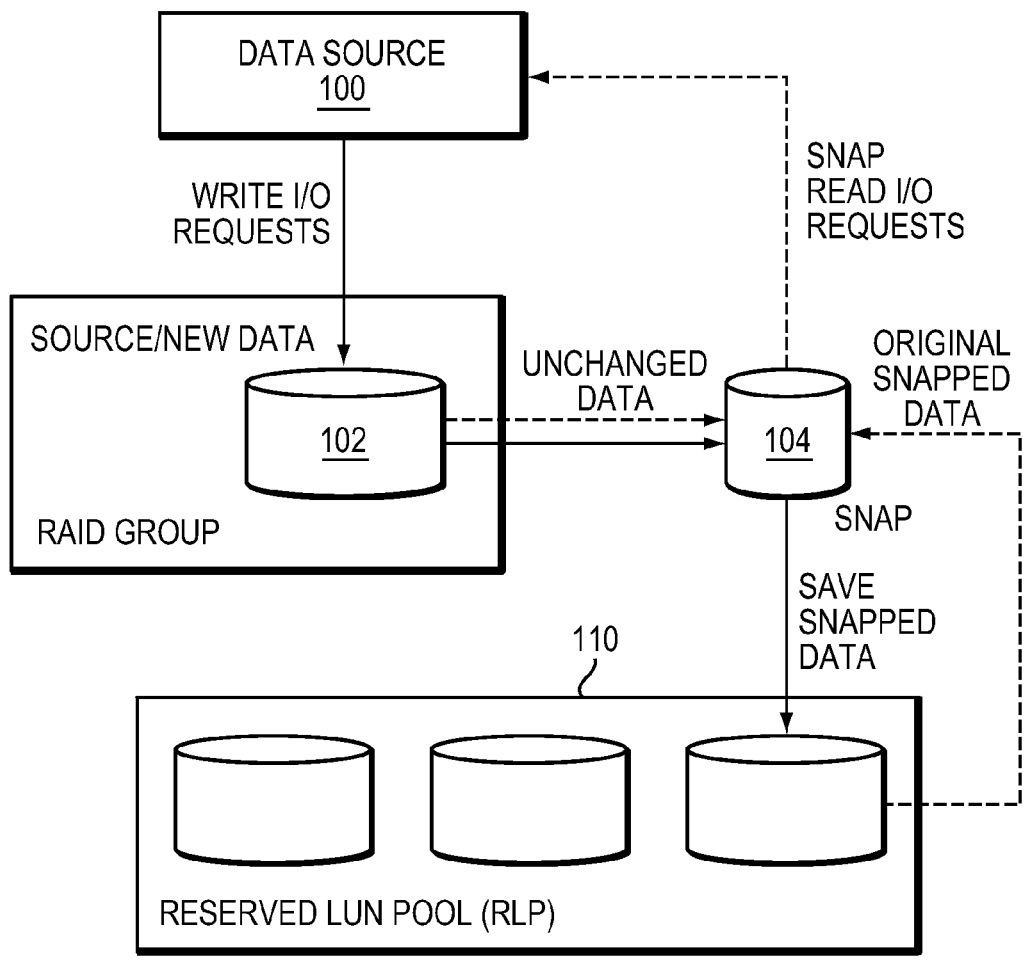
FIGS. 3-11 are block diagrams illustrating in more detail components that may be used in connection with techniques described herein.

Referring to FIG. 3, shown is an illustration of an example snapshot copy facility based on a copy-on-write method. In a backup/versioning operation, a "copy-on-write" method can be employed such that changes to a data set made after a point in time result in copies of the original data that was stored in a first data volume at the point in time being copied to a reserved LUN of a reserved LUN pool—a data volume acting as, for example, a backup location—before being overwritten in the first volume. In this way, the data set can be restored or "rolled back" to the point in time. The copy-on-write method creates a copy on first write snapshot.

Thus, a copy on first write ("COFW") snapshot may be a point in time copy of a LUN based on a RAID group such that upon receiving a write I/O request to the LUN, original data stored on the LUN is first copied to a reserved LUN pool in order to preserve the point in time copy before performing the write I/O request on the LUN. Thus, for example, as shown in FIG. 3, upon receiving a write I/O request from data source 100 to source data 102, data of snapshot 104 is first copied to a reserved logical unit stored in the reserved LUN pool 110. Thus, original snapped data is first copied to the reserved logical unit stored in the reserved LUN pool 110 before writing new data associated with the write I/O request to LUN 102. When data source 100 issues a read I/O request, a snapshot mount point is first associated with the snap 104 and the read I/O request is then performed on the snapshot mount point by reading original data from the reserved logical unit stored in the reserved LUN pool 110, and unchanged data from the source LUN 102.

Further, a "snapshot" is any suitable collection of data structures that creates a copy-on-write point in time copy of a data set and store information relating to changes made to one or more data sets that affect both data units that store valid data for the data set when snapshot is created and those that do not. A snapshot may be associated with a point in time—for example, the time it was created or applied—and adapted to store information regarding changes made to a data set after that point in time. The data set for the snapshot may be specified in any suitable manner, including by specifying some collection of logically related storage objects (e.g., a file system or database), one or more volumes of storage, or in any other suitable manner.

Figure 4:
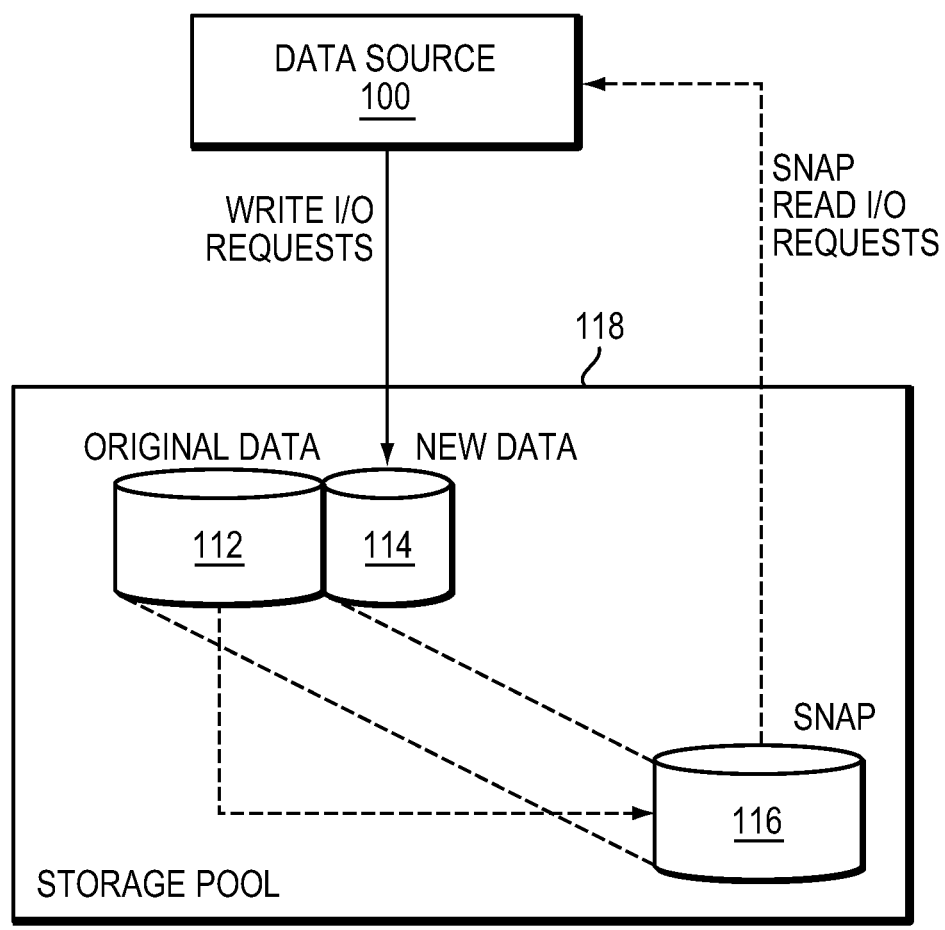

Referring to FIG. 4, shown is an illustration of an example snapshot copy facility based on a redirect on write snapshot that may be included in an example embodiment using the techniques described herein. It should also be appreciated that at least some implementations of the example snapshot copy facility, including alternative implementations, may use a file system based snapshot copy facility (also referred to herein as "mapped replica process") for maintaining a replica that does not require a copy on first write as described above herein in FIG. 3 and does not require a save area. For example, storage system replication may operate on fixed size extents of data residing on a LUN that is being replicated. Extents typically range from 512 bytes (a disk sector) to multiple megabytes (MB). Further, a LUN may be mapped to a file such that the file system based snapshot copy facility creates a replica of the file.

Typically, the file system based snapshot copy facility (also referred to herein as "replication process") creates a replica of a file by creating a version of the file using a delegated reference counting mechanism. The delegated reference counting mechanism is described in U.S. Pat. No. 8,032,498 entitled "Delegated reference count base file versioning" issued Oct. 4, 2011, which is incorporated herein by reference in its entirety.

Thus, a file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file.

In at least one embodiment of the current technique, a redirect on write ("ROW") snapshot may be a point in time copy of a base LUN that resides in a storage pool. In the case of a ROW snapshot of a base LUN, unlike a COFW snapshot, original data of the base LUN is not copied to a reserved LUN pool when writing to the base LUN. Instead, with a ROW snapshot, a write I/O request to a base LUN writes data to a different storage pool, or to a different location in a storage pool, than the location at which the original data of the base LUN is stored.

A snapshot copy facility that creates a ROW snapshot also stores mapping information regarding changes between a ROW snapshot and a base LUN based on which the snapshot is created. Thus, when a ROW snapshot is created based on a base LUN, a new write I/O request to the base LUN writes data to a new location in a storage pool. Further, it should be noted that a ROW snapshot may be a point in time copy of any one of the logical objects such as a base LUN, another ROW snapshot or a snapshot mount point. Thus, as described above herein, a redirect on write snapshot addresses a limitation of a copy on first write snapshot by not copying data to a reserved LUN pool. A ROW snapshot is based on a reserved LUN that is provisioned from a storage pool. In contrast, a COFW snapshot is based on a LUN that is either provisioned from a RAID group or from a storage pool. Further, a ROW snapshot may represent a point in time copy of either a snapshot mount point or a consistency group. Conversely, a COFW snapshot can represent neither a point in time copy of a snapshot mount point nor a consistency group. A data storage system may choose a replication process based on the type of snapshot that is required by a user.

For example, as shown in FIG. 4, a write I/O request received from data source 100 writes new data associated with the write I/O request to a new location 114 in the storage pool 118 without changing or copying original data 112. Further, a read I/O request directed to snap 116 is performed by first associating a snapshot mount point with the snap 116 and performing the read I/O request on the snapshot mount point which enables data source 100 to read snapped data from original location 112 and new data from new location 114.

Replication processes may be carried out in any suitable manner. FIG. 4 shows one example of performing replication that may be implemented by a replication facility in accordance with some of the embodiments described herein. It should be appreciated, however, that FIG. 4 is merely illustrative of replication processes that may be implemented, as implementations of the technique are not limited in this respect. In the illustrative example described below, the replication process is described as operating on a data set. It should be appreciated that the data set may be any volume of storage or any collection of logical storage objects, such as a file system or a database, as the aspects of the technique described herein are not limited to use with replicating any particular type of data set.

Further, a snapshot may be resized (also referred to herein, individually or collectively, as "expand" or "shrink") via an SMP. A resize operation effectively increases or decreases the size on the data object that the SMP is attached to. In at least one embodiment of the current technique, the expand operation itself may be performed without the need for additional storage space.

In at least one embodiment of the current technique, a snapshot may be created and then deleted at a later time. However, a snapshot may not be available for performing an I/O operation on the snapshot unless a snapshot mount point is associated with the snapshot. Associating a snapshot mount point to a snapshot is also referred to herein as attaching the snapshot mount point to the snapshot. Thus, a snapshot mount point associated with a snapshot provides a set of interfaces for accessing data of the snapshot and performing I/O operations (e.g., read, write) on the snapshot.

In at least one embodiment of the current technique, a user specifies a logical object such as a LUN or a snapshot of a LUN as a source object for creating a snapshot. A snapshot of a source object is created in the same storage pool in which the source object resides. A snapshot mount point is an abstraction of a logical object such as a LUN that does not include any data at the time the snapshot mount point is created. Thus, an I/O operation such as read and write to a snapshot mount point fails until the snapshot mount point is associated with a snapshot. When a snapshot mount point is associated with a snapshot, an I/O operation such as read and write directed to the snapshot mount point is performed on data of the snapshot.

In at least one embodiment of the current technique, a snapshot mount point for a base LUN is created in the same storage pool in which the base LUN resides. Further, a snapshot mount point is associated with a snapshot derived from a base LUN. A snapshot mount point is associated with a default set of properties at the time the snapshot mount point is created. When a snapshot mount point is attached to a snapshot, a set of properties of the snapshot is associated with the snapshot mount point. Further, at the time a snapshot mount point is detached from a snapshot, the snapshot mount point includes a set of properties of the snapshot. A user may need to specify a snapshot and a snapshot mount point when attaching the snapshot mount point to the snapshot.

In at least one embodiment of the current technique, a consistency group ("CG") may be a group represented by an object that includes a set of logical objects such that each logical object of the set of logical objects may be a base LUN, a snapshot of a base LUN, or a snapshot mount point representing a snapshot. Logical objects in a consistency group are treated as a single object in order to create consistent snapshot copies of the consistency group. Thus, a consistency group may be created by grouping together a set of LUNs (e.g., DLU, TLU). Alternatively, a consistency group may also be created by grouping together a set of snapshot mount points. Consequently, a consistency group is a collection of related logical volumes that need to be kept in a consistent state. Thus, a consistency groups maintain write-ordered data consistency across logical volumes included in the consistency group.

In at least one embodiment of the current technique, a consistency group may be considered as a named list of logical objects such as LUNs and snapshot mount points. A consistency group may be created, modified and deleted. Further, a consistency group may be indicated as a source for creating a snapshot thereby resulting in creation of a consistent snapshot.

In at least one embodiment of the current technique, a consistency group may be created by grouping together a set of snapshot mount points. When creating a consistency group, a user may need to provide a name for the consistency group and optionally specify a list of snapshot mount points. Each snapshot mount point of a list of snapshot mount points included in a consistency group may be associated with a snapshot of a base LUN (e.g., a DLU and TLU). If a user does not provide a name when creating a consistency group, the mapped LUN driver may generate a unique name and assigns the unique name to the consistency group. The state of a consistency group is defined based on states of snapshot mount points that are included in the consistency group. Thus, if any one of the snapshot mount point that is part of a consistency group is in an erroneous state such as a faulted or an offline state, the state of the consistency group is defined as "offline" or "faulted" respectively.

In at least one embodiment of the current technique, a consistent snapshot is a point in time copy of a consistency group. Thus, a consistent snapshot is similar to a snapshot of a LUN. However, instead of including a single point in time copy of a LUN, a consistent snapshot includes a point in time copy of a list of logical objects (e.g., LUN, snapshot, snapshot mount point) that are part of a consistency group thereby indicating point in time copies of each logical object of the list of logical objects. A consistent snapshot maintains a write order consistency for each logical object of the list of logical objects included in a consistency group. A consistent snapshot may be created by using any one of the two mechanism described below herein. First, a consistent snapshot may be created by specifying a consistency group as a source object for creating a snapshot. Second, a consistent snapshot may be created by specifying another consistent snapshot as a source object for creating a snapshot thereby resulting in a snapshot of the other consistent snapshot.

A snapshot of a consistency group (also referred to herein as "snapshot CG") includes a set of logical objects based on which snapshots may be created such that a write order consistency is maintained for the snapshots. A consistency group is identified by a name and includes information (e.g. names of logical objects) regarding a set of logical objects (e.g., LUN, snapshot of a LUN). When a snapshot copy of a consistency group is created, a consistent snapshot is created such that the consistent snapshot is identified by a single name and represents a snapshot of each logical object in the set of logical objects that are created at the same point in time.

Further, when a snapshot of a consistency group is created, respective snapshot of each base LUN of the set of base LUNs is created at the same point in time thereby preserving a write order for the set of base LUNs. A consistent snapshot is also referred to herein as a snapshot set. Typically, a set of LUNs used by an application are organized as a consistency group in order to create consistent snapshots of the set of LUNs.

In at least one embodiment of the current technique, a snapshot set may be a set that includes snapshots from one or more snapshot families. A snapshot set results when a snapshot of a consistency group is created. A snapshot set is accessible to a user as a snapshot of one or more LUNs. A snapshot set is also referred to herein as a replica set.

In at least one embodiment of the current technique, a snapshot mount point may be attached to a consistent snapshot. Further, one or more snapshot mount points may be attached to one or more snapshots included in a consistent snapshot as the consistent snapshot includes snapshots of one or more source logical objects.

Figure 5:
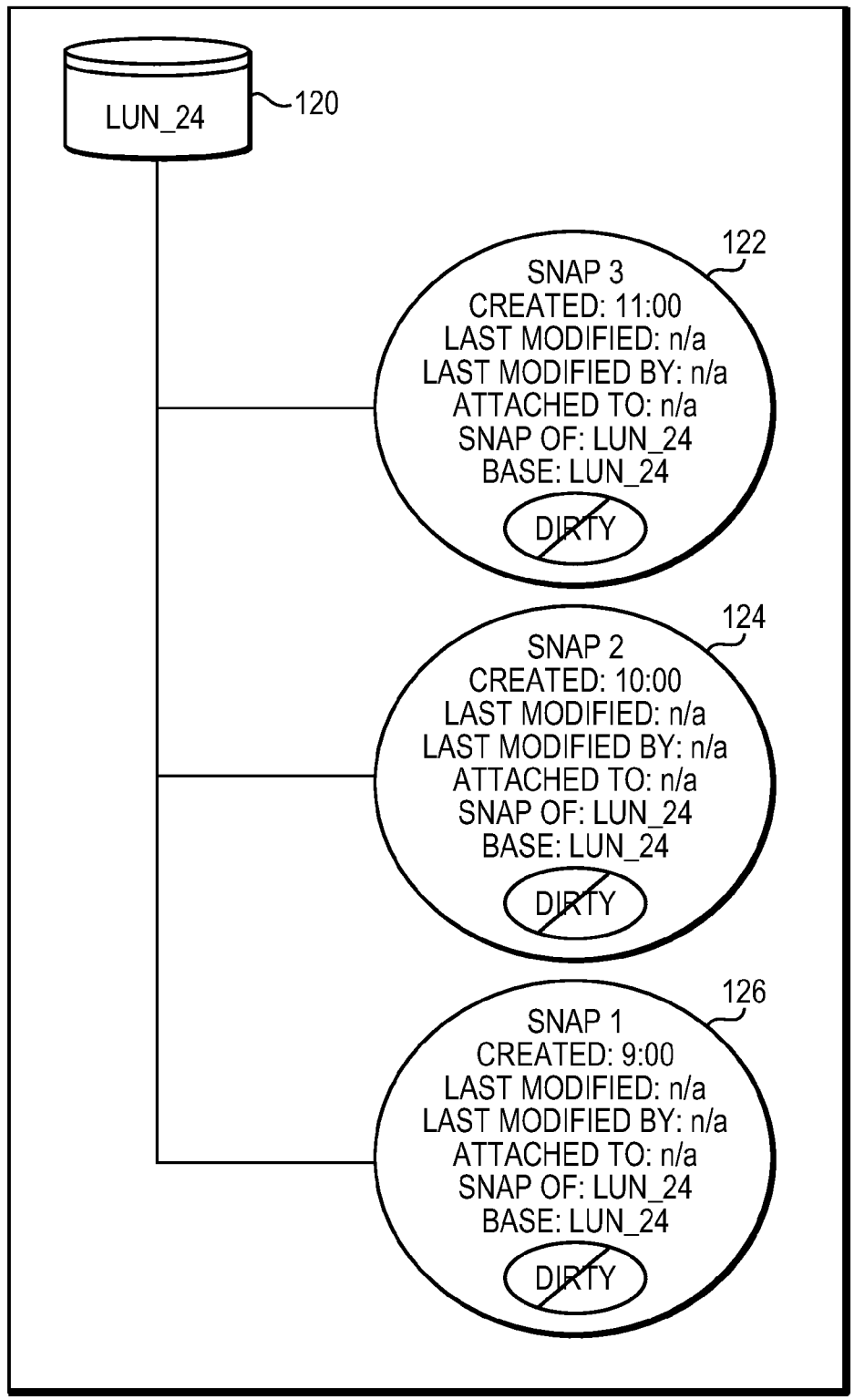

Referring to FIG. 5, shown is an illustration of creating a snapshot of a LUN in a data storage system. In at least one embodiment of the current technique, a snapshot copy facility creates snapshot copies of LUN 120 at different point in times. For example, snap-1 126 is created at 9:00 AM, snap-2 124 is created at 10:00 AM, and snap-3 122 is created at 11:00 AM.

Figure 6:
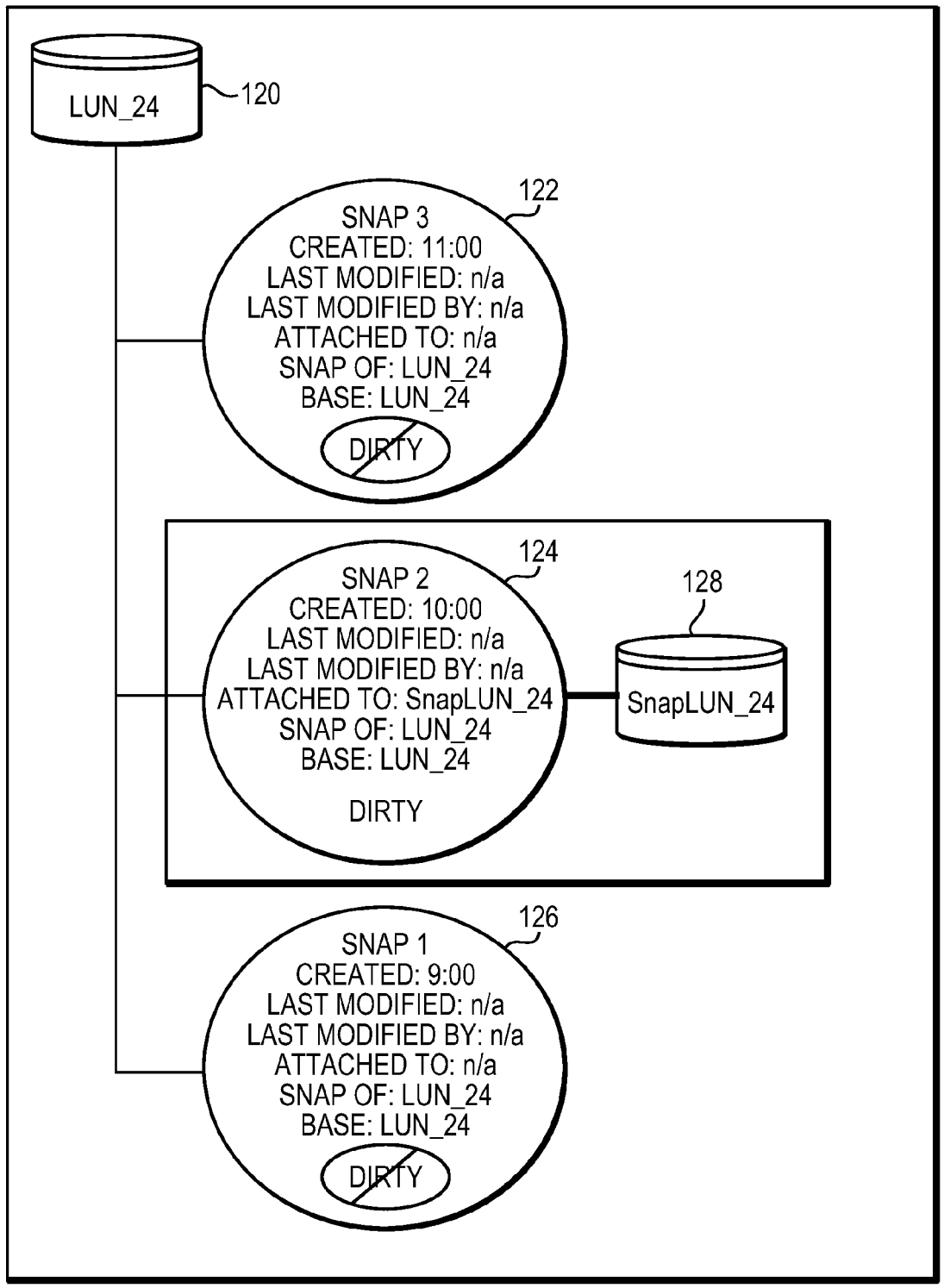

Referring to FIG. 6, shown is an illustration of attaching a snapshot mount point to a snapshot of a LUN in a data storage system. With reference also to FIG. 5, a snapshot mount point 128 is attached to snap-2 124. Thus, a host or user may perform an operation on the snapshot "snap-2" 124 by using the snapshot mount point 128 shown as "snapLUN__24" in FIG. 6. The snapshot "snap-2" 124 is marked as "dirty" indicating that an I/O operation directed to the snapshot mount point 128 attached to the snapshot 124 may change contents of the snapshot 124.

Figure 7:
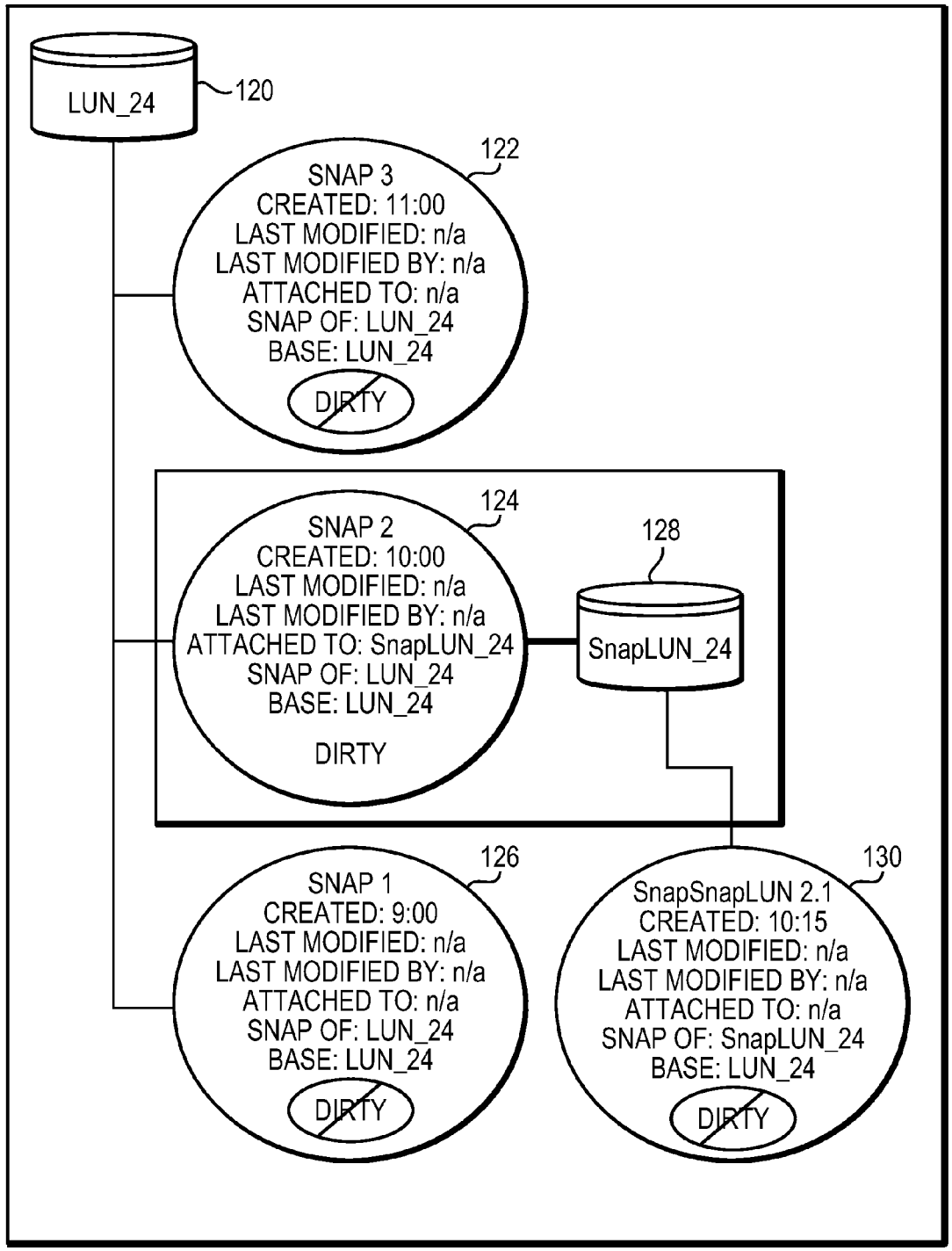

Referring to FIG. 7, shown is an illustration of creating a snapshot of a snapshot mount point attached to a snapshot of a LUN in a data storage system. With reference also to FIGS. 5-6, a snapshot copy facility creates a snapshot 130 of the snapshot mount point 128. The snapshot 130 of the snapshot mount point 128 indicates a point in time copy of the snapshot mount point 128.

Figure 8:
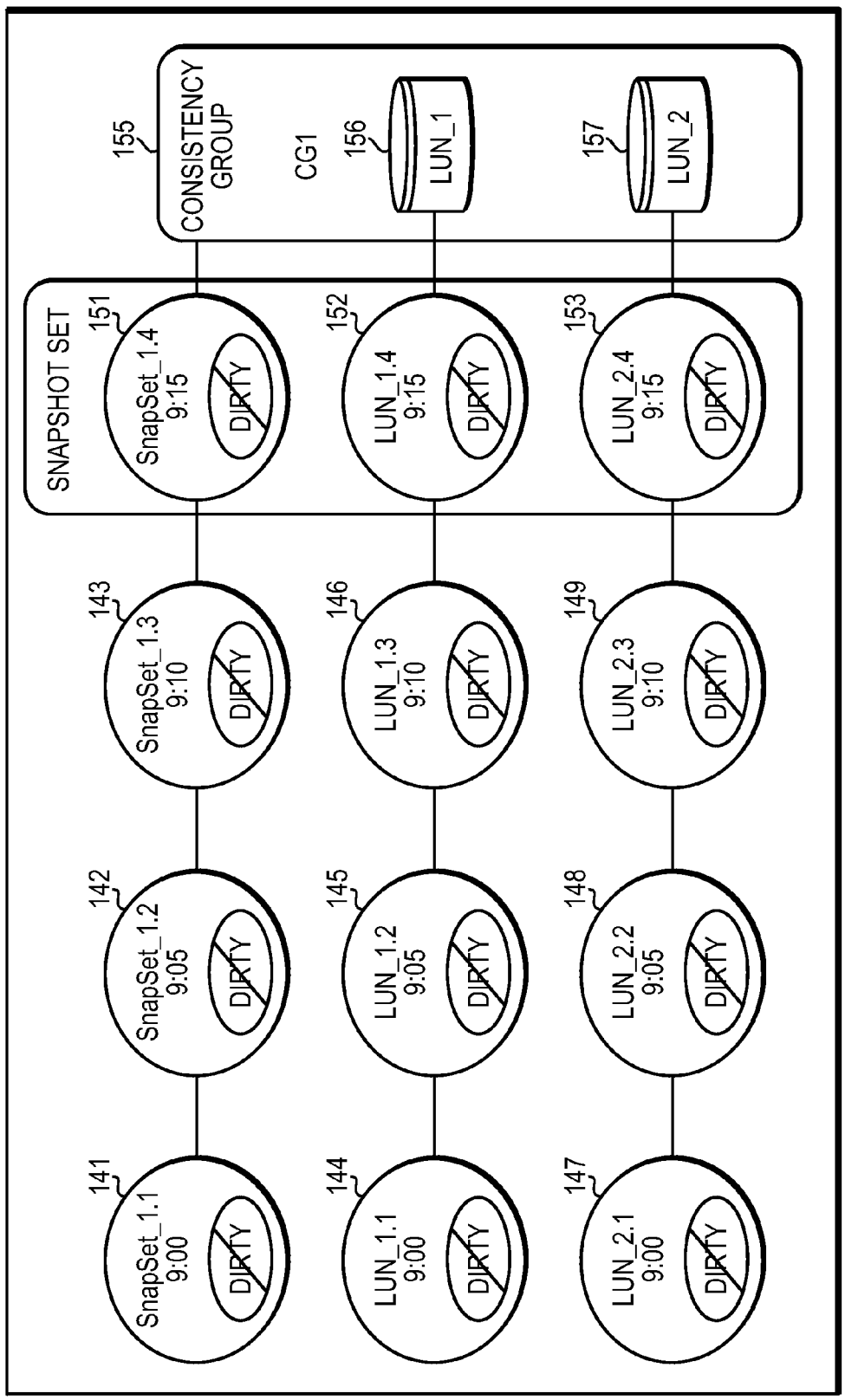

Referring to FIG. 8, shown is an illustration of creating a snapshot set in a data storage system. With reference also to FIGS. 5-7, a snapshot of a consistency group 155 results in a snapshot set (such as snapset__1.4 151) that represents snapshots (such as LUN__1.4 152, LUN__2.4 153) of logical objects (e.g., LUN__1 156, LUN__2 157) included in the consistency group 155. Further, for example, second snapshot set 143 may include snapshot copies such as LUN__1.3 146 and LUN__2.3 149. Further, for example, third snapshot set 142 may include snapshot copies such as LUN__1.2 145 and LUN__2.2 148. Further, for example, fourth snapshot set 141 may include snapshot copies such as LUN__1.1 144 and LUN__2.1 147.

Figure 9:
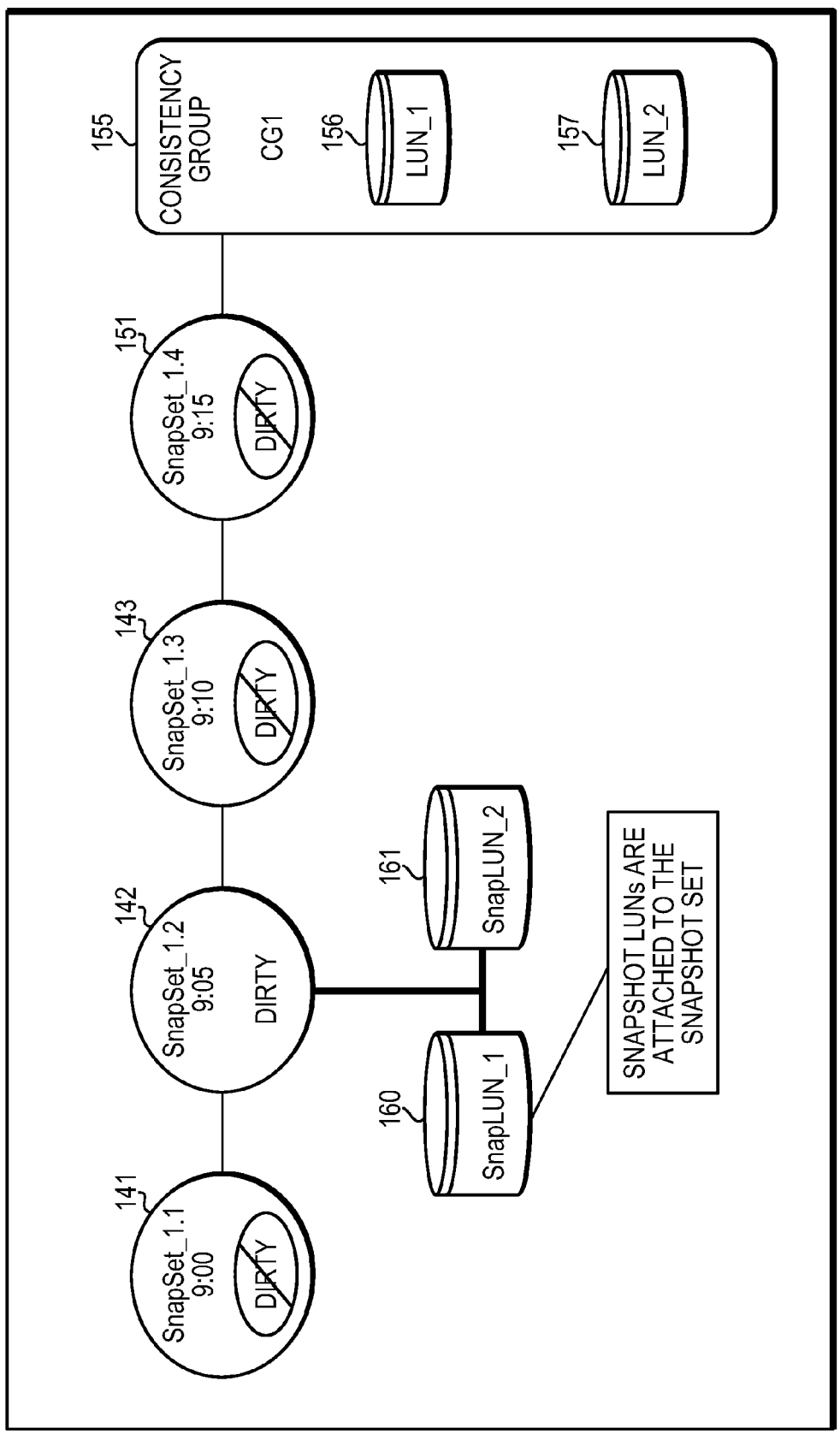

Referring to FIG. 9, shown is an illustration of attaching a snapshot mount point to a snapshot set in a data storage system. With reference also to FIGS. 5-8, snapshot mount points 160 and 161 are attached to the snapshot set 142 such that a user or host may access the snapshot set 142 and perform an operation on the snapshot set 142.

Figure 10:
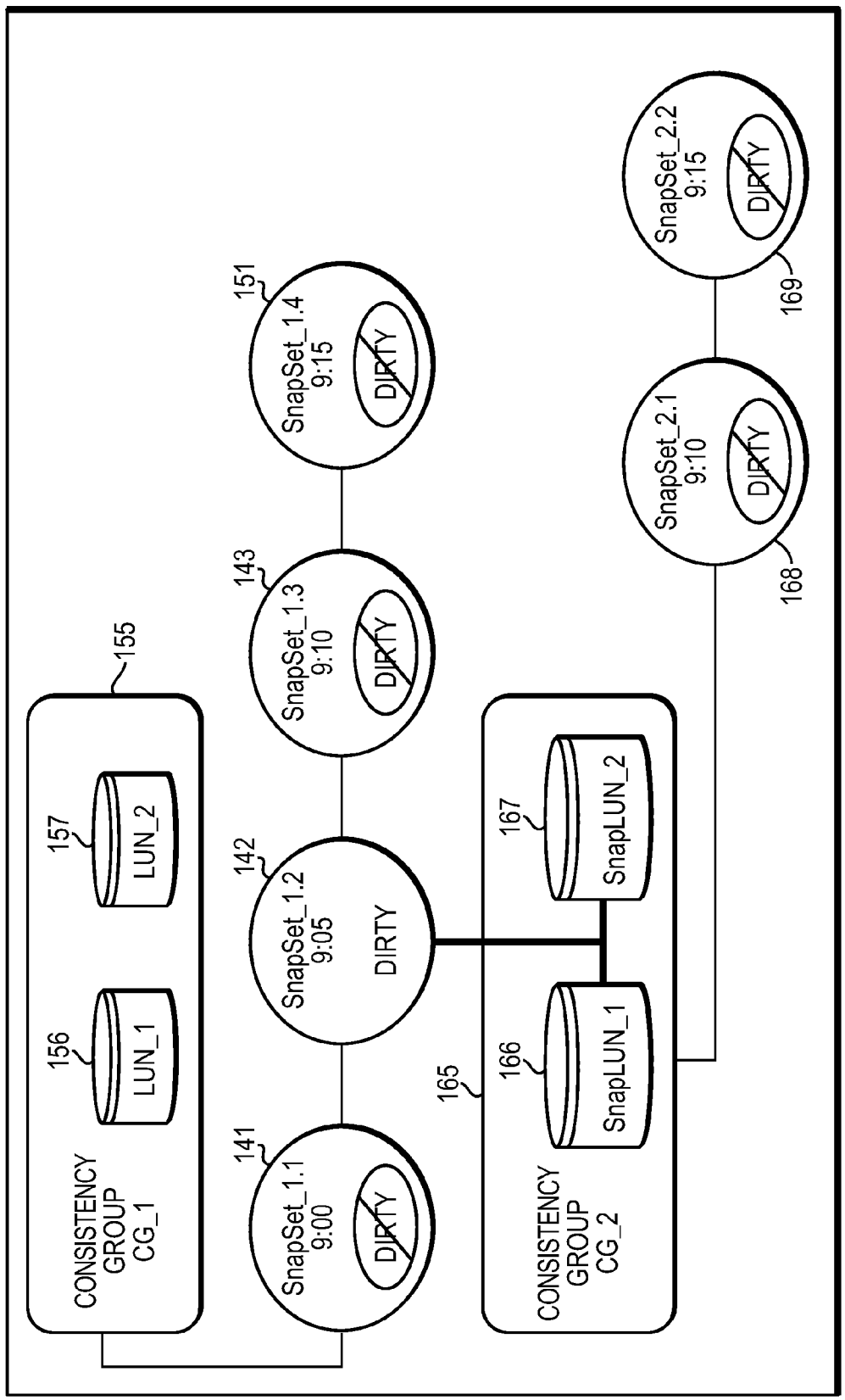

Referring to FIG. 10, shown is an illustration of creating a consistency group including a set of snapshot mount points in a data storage system. With reference also to FIGS. 5-9, a consistency group 165 is created by grouping together a set of snapshot mount points such as snapLUN__1 166 and snapLUN__2 167. Consequently, a user, host or an application may now access the consistency group 165 in such a way that the set of snapshot mount points included in the consistency group 165 are treated as a single logical object. Thus, creating a snapshot of the consistency group 165 results in a snapshot set similar to a snapshot set created when a snapshot of a consistency group including base LUNs is created as shown in FIG. 8. Referring back to FIG. 10, for example, a snapshot set "snapset__2.1" 168 is created by creating a snapshot of consistency group 165 at a specific point in time (e.g., 9:10 AM). Further, a snapshot set "snapset__2.2" 169 is created by creating a snapshot of consistency group 165 at another specific point in time (e.g., 9:15 AM).

Figure 11:
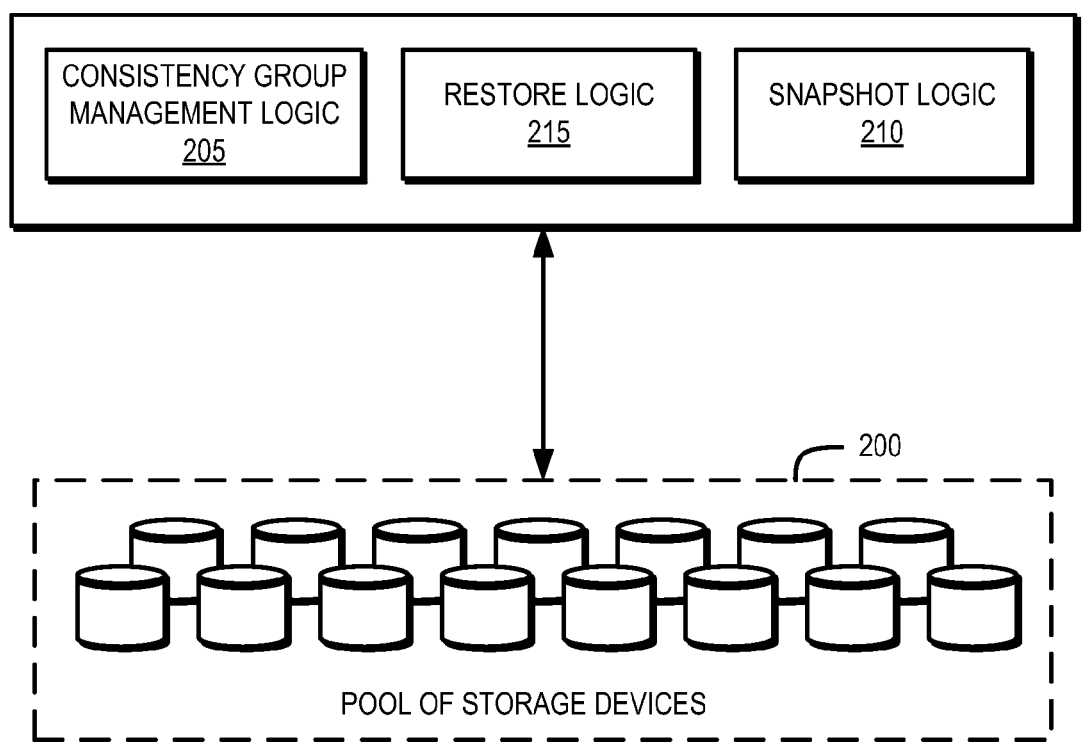

Referring to FIG. 11, shown is a more detailed representation of components that may be included in an embodiment using the techniques herein. In at least one embodiment of the current technique, snapshot logic 210 creates a snapshot of a base LUN which resides in storage pool 200. The snapshot is attached to a snapshot mount point in order to access the snapshot for performing an operation on the snapshot. A user, host or an application may then access the snapshot mount point similar to how a LUN or is accessed. The user, host or application may perform I/O operations such as data read or write, LUN shrink operation, rename operation, restore operation, expand operation, and rollback operation on the snapshot mount point. Thus, any one of the operations that may be performed on a LUN may also be performed on a snapshot by associating the snapshot with a snapshot mount point.

A snapshot of a snapshot mount point may also be created such that the snapshot represents a point in time copy of the snapshot mount point. Restore logic 215 provides a mechanism to, for example, restore or roll back a LUN to a previous point in time replica. The restore logic 215 may also include snapback driver logic (not shown). Additional details regarding the restore mechanism is described below with reference to FIG. 12. Consistency group management logic 205 enables a user, host or an application to create a consistency group of snapshot mount points such that the group of snapshot mount points are treated as a single logical object and write consistency is maintained when performing I/O operations on snapshots associated with the snapshot mount points included in the consistency group. Further, snapshot logic 210 may create a snapshot of the consistency group thereby creating a consistent snapshot. Further, a consistency group may store information regarding a set of snapshot mount points included in the consistency group in a persistent database on a data storage system.

Figure 12:
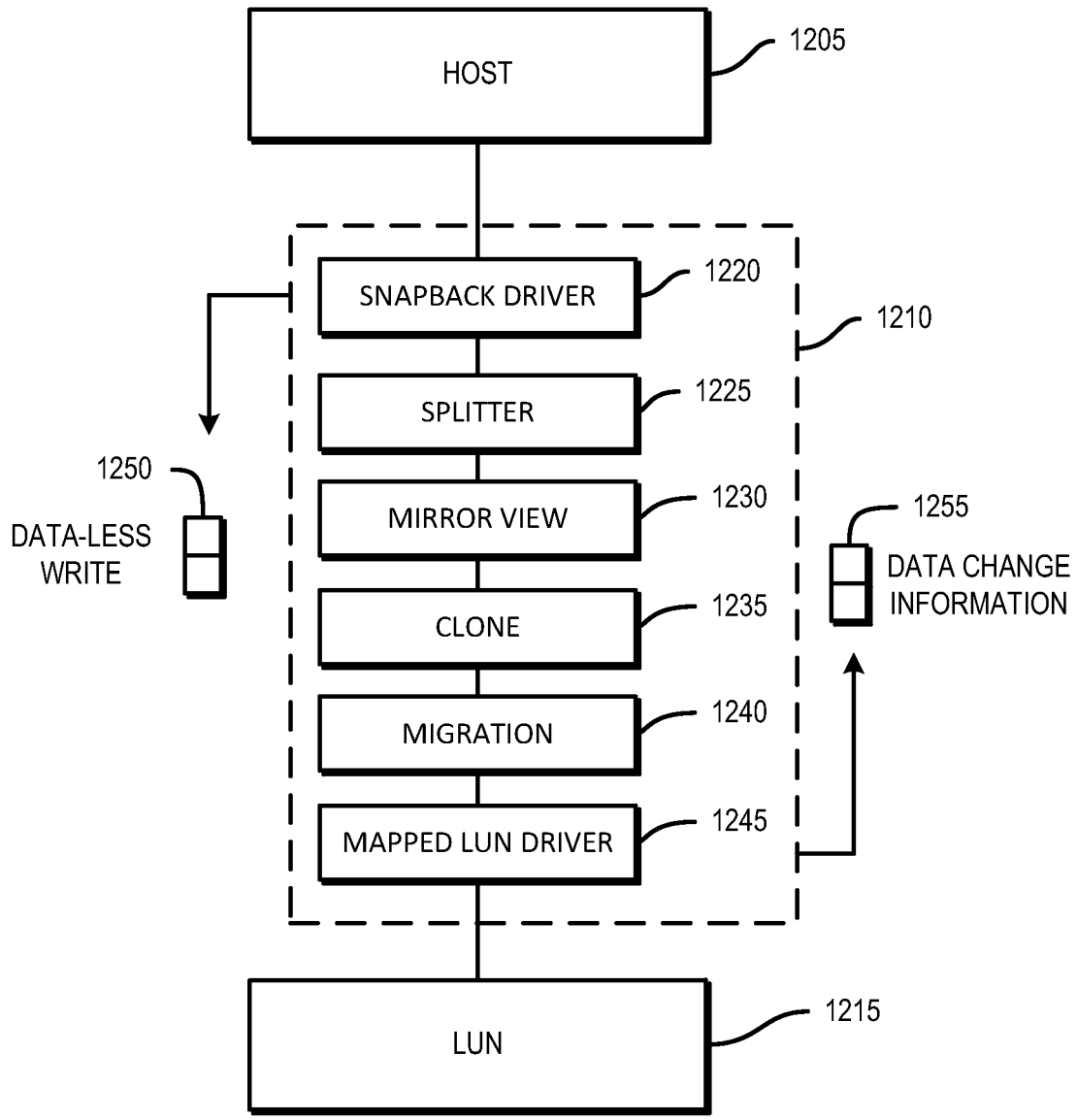
FIG. 12 is an example illustrating a layered driver stack that may be used in connection with techniques described herein.

Referring to FIG. 12, shown is a device driver stack order according to an example embodiment. Data-less write operations 1250 initiated by the snapback driver 1220 travel down the stack through various drivers that comprise the device layer stack 1210 to a LUN 1215. The data-less write operation can be view as a write with an offset and length but no data buffer. The MLU driver will see the offset and length and process the write. However, because there is not data payload, the write is a trivial operation, unlike conventional write operations. The device layer stack 1210 may include a number of drivers, such as a snapback driver 1220, splitter 1225, mirrorview 1230, clone 1235, migration 1240, and mapped LUN driver 1245. It should be noted any ordering of driver implied by this illustration or the description thereof is not to be construed as limiting the type, function, or quantity of drivers or respective order. Various example embodiments may include more or fewer drivers are within the scope of the present invention.

In an example embodiment employing techniques described herein, the snapback driver may be located in the stack above all the drivers that care about data changes and a MLU driver located near the bottom of the stack. These two drivers communicate with each other such that the MLU driver tells the snapback driver when there's been an event that requires a notification. The snapback driver then sends a query to determine if any data has changed. The query is propagated down the stack to the MLU driver. This operation, referred to as a "describe extents," determines whether any data changed within a specified range (e.g., a particular LBA and offset).

The describe extents query is sent down the device stack because there can be layers in between that may alter addressing information (e.g., a layered driver could change the offset by 1). The operation ensures that each layer in between correctly manages the address. Accordingly, the describe extents is sent all the way down the stack to the MLU driver. The MLU will respond yes or no to the request (i.e., whether data changed or not). The data change determination 1255 bubbles back up through the driver stack to the snapback driver with information regarding whether there were any changes in the specified range.

Data-less writes are used because most layered-drivers don't modify the addressing information and can therefore pass the describe-extents messages along without interpreting them. Then the data-less writes follow and trigger the normal change tracking. Thus the intervening drivers are trivially modified to handle the data-change that occurs below them in the device stack.

Drivers that depend on the consistency of the data may perform a pre-step operation in order to put the driver in a tracking mode. For example, in the case of mirrorview/s, a fracture would be initiated wherein the mirroring relationship would be broken in order to track the changes. Once in fracture mode, mirrorview/s would see the write offset and length associated with the data less write when would then track it in its track changes bitmap.

In one example embodiment, the describe extent range may be chosen based on the extend size specified when the volume is first setup. Once the volume is set up, the snapback driver can send down a handshake to determine what the minimum extent size is for the whole device stack.

The techniques described above may be initiated after an instantaneous restore (i.e., restore via file ID swap) has been performed. That is, the MLU driver initiates the instantaneous restore, the snapback driver is notified that the restore has been performed, and the snapback driver tries to determine which areas of the LUN have changed as a result of the restore operation. Changes may be determined by going down the stack asking the MLU driver, extent-by-extent, (i.e., walking the entire address space of the LUN at a certain increment size), determining if any changes have occurred. This may be performed by, for example, sending a query with the file IDs for two files to the MLU driver to determine if anything has changed. The files block pointers can be examined to determine if any changes to the blocks have occurred. Any changes can be reported back up through the stack back to the snapback driver. It should be noted that while detecting any changes between these two files, certain restrictions may be placed on the files (e.g., can't delete, attach, etc.) so as to maintain data at a point in time when the restore on the two files or snaps was performed. These restrictions can be removed once the change determination has been completed. Advantageously, the specific changes do not need to be enumerated, rather a message that something in the range has changed is sufficient.

The techniques may be employed in conjunction with application device drivers that track write operations communicated down the device stack. For example, mirrorview/s may be fractured wherein changes to a primary LU are tracked in a fracture log. Mirroring relationships include different states wherein the secondary image can by 'in-sync' (i.e., a byte-for-byte copy of primary) or 'consistent' (i.e., a byte-for-byte copy of primary at some point in time in the past). The secondary image can be fractured away from primary which means that the secondary will be a consistent image of the primary at some point in the past. When fractured, the primary image will keep track of any changes in a bitmap and this bitmap can be used to sync the secondary images to the primary image.

However, when a sync occurs, the primary LU is analyzed in a sequential, non consistent manner. During this process, the secondary image state is referred to as synchronizing. Consequently, the secondary image is not recoverable. Therefore, while in snapback mode, the secondary image is placed in a consistent mode, i.e., fracture mode. In this way, track changes are sent down the stack as data-less writes. Mirrorview/s keeps track of the track changes in the bitmap. After finishing the data-less writes, the secondary image is consistent, but the primary image may have accumulates a number of changes in the fracture log that need to be synchronized. At this point, the secondary image can be synchronized whereby all the data gets copied, i.e., the primary image will see the bits that are set and will march across the LUN in a non-consistent manner synchronizing the data to the secondary image.

Typically, the system may not know how long the restore will take and, as mentioned above, the secondary image it is not in a recoverable state while it is synchronizing (e.g., the secondary cannot be promoted). Thus, these techniques attempts to limit this window of time during which the secondary is not available.

Figure 13:
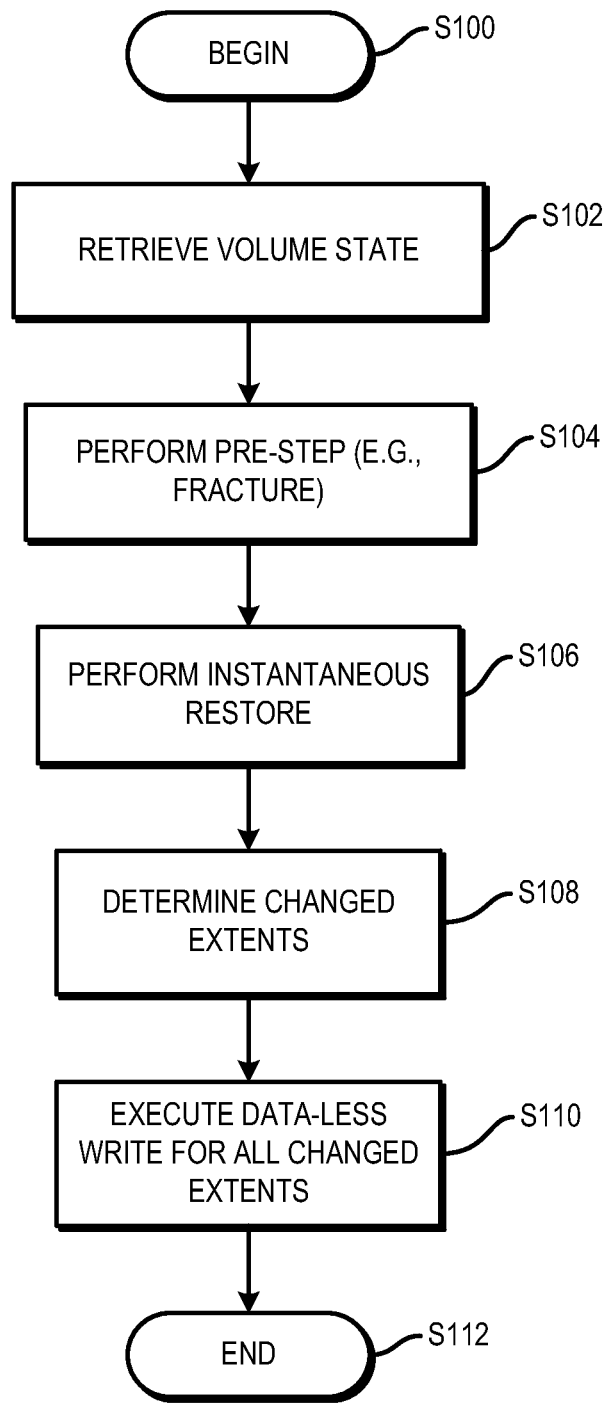
FIG. 13 is a flow diagram illustrating a process that may be used in connection with techniques described herein.

Referring to FIG. 13, shown is a flow diagram that illustrates an example method for use in managing restore operations using data-less writes. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the restore method can begin with a step S100 with the initiation of a restore command. The method can be initiated manually by a user, for example, by entering a command in a command-line-interface or by clicking on a button or other object in a graphical user interface (GUI). The method can also be initiated automatically by storage management software and/or can be scheduled to run automatically at certain dates and times.

The method may further include a step S102 where a system process retrieves a volume state of, for example, a primary LU arranged in a mirrorview configuration. Volume states may include extent change notification, device state, and the like. When the state is determined, the flow may proceed to step S104 where the method may perform a pre-step, such as fracturing a secondary LU of the mirrorview configuration. At step S106, the method performs an instantaneous restore by, for example, swapping the underlying file IDs for the primary LU and a point in time snapshot of the primary LU. At step S108, the method may issue a describe extents command to determine if there are any extents that have changed after the restore command has been performed. At step S110, if changes have been determined, the method may execute a data-less write where the write flows down a layered driver stack, from a snapback driver, through various other layers, to a MLU driver. The describe extents call and data-less write commands may be looped until all changed extents have been written to via the data-less write operation. The restore method may end at step S112.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing restore operations in storage systems, the method comprising:
retrieving a state of a first logical object;
placing a second logical object in a pre-step mode;
performing an instantaneous restore between the first logical object and the second logical object;
identifying changed data extents in the first logical object; and
sending a data-less write to all changed extents identified in the first logical object.

2. The method of claim 1, wherein the instantaneous restore includes restoring a snapshot to a primary logical unit (LU).

3. The method of claim 2, wherein the snapshot is a snapshot mount point.

4. The method of claim 2, wherein the snapshot is associated with a point in time replica of a LU, snapshot LU, or snapshot mount point.

5. The method of claim 1, wherein the instantaneous restore includes swapping a snapshot file ID with a primary LU file ID.

6. The method of claim 1, wherein the first logical object is a primary LU and the second logical object is a secondary LU, wherein the primary LU and secondary LU are arranged in a mirrorview configuration.

7. The method of claim 6, wherein the pre-step mode includes fracturing the secondary image.

8. The method of claim 1, wherein the instantaneous restore includes restoring the first logical object to the second logical object, the first logical object having a different size than the second logical object.

9. A system for managing restore operations in storage systems, the system comprising:
at least one storage processor configured to:
retrieve a state of a first logical object;
place a second logical object in a pre-step mode;
perform an instantaneous restore between the first logical object and the second logical object;
identify changed data extents in the first logical object; and
send a data-less write to all changed extents identified in the first logical object.

10. The system of claim 9, wherein the instantaneous restore includes restoring a snapshot to a primary logical unit (LU).

11. The system of claim 9, wherein the snapshot is a snapshot mount point.

12. The system of claim 9, wherein the snapshot is associated with a point in time replica of a LU, snapshot LU, or snapshot mount point.

13. The system of claim 9, wherein the instantaneous restore includes swapping a snapshot file ID with a primary LU file ID.

14. The system of claim 9, wherein the first logical object is a primary LU and the second logical object is a secondary LU, wherein the primary LU and secondary LU are arranged in a mirrorview configuration.

15. The system of claim 14, wherein the pre-step mode includes fracturing the secondary image.

16. The system of claim 9, wherein the instantaneous restore includes restoring the first logical object to the second logical object, the first logical object having a different size than the second logical object.

* * * * *